UNITED STATES PATENT OFFICE.

GEORG PINKUS, OF CHARLOTTENBURG, GERMANY.

PATTERN-POWDER.

No. 840,251.  Specification of Letters Patent.  Patented Jan. 1, 1907.

Application filed May 4, 1906. Serial No. 315,182.

*To all whom it may concern:*

Be it known that I, GEORG PINKUS, Ph. D., a citizen of the Empire of Germany, residing in Charlottenburg, in the Kingdom of Prussia and Empire of Germany, have invented certain new and useful Improvements in Pattern-Powders, of which the following is a specification.

This invention relates to an improved pattern-powder which is intended to be used in place of the well-known lycopodium powder and which is produced from corn-starch (zea maize) and a substance which is not capable of taking up moisture, such as wax or resin.

Potato-starch has been used heretofore as a pattern-powder; but this starch has the disadvantage that it swells when being burned by the cast metal and that it carries away the molding sand, so that the latter peels off in thin scales. The use of corn-starch obviates this disadvantage and prevents the peeling off of the sand.

The wax to be mixed with the corn-starch must have a certain degree of hardness. Good carnauba-wax is preferred. Wax of lesser hardness can be hardened by the addition of resins. Sometimes resin alone is sufficient; but the powder becomes thereby harder and more brittle. For producing a pattern-powder which possesses the bulky volume of the lycopodium a light and fine powder, such as pulverized magnesium oxid (magnesia usta) or kieselguhr (infusorial earth) is added to the corn-starch in a quantity which is equal to the volume of the starch.

Example: One hundred kilograms of corn-starch, eight kilograms of wax, ten kilograms of finely-pulverized magnesium oxid or infusorial earth are thoroughly mixed and then heated to a temperature of from 80° to 100° centigrade until the powder will be water-repellent—that is to say, incapable of absorbing water. After the powder is cooled it is ready for use.

Having thus described my invention, I claim as new and desire to secure by Letters Patent—

1. As a new composition of matter, a pattern-powder containing a mixture of corn-starch and wax.

2. As a new composition of matter, a pattern-powder containing a mixture of corn-starch, wax and resin.

3. As a new composition of matter, a pattern-powder containing a mixture of corn-starch, wax, resin and a light and fine powder.

4. As a new composition of matter, a pattern-powder containing a mixture of corn-starch, wax, resin and infusorial earth.

In testimony that I claim the foregoing as my invention I have signed my name in presence of two subscribing witnesses.

GEORG PINKUS.

Witnesses:
WOLDEMAR HAUPT,
HENRY HASPER.